UNITED STATES PATENT OFFICE.

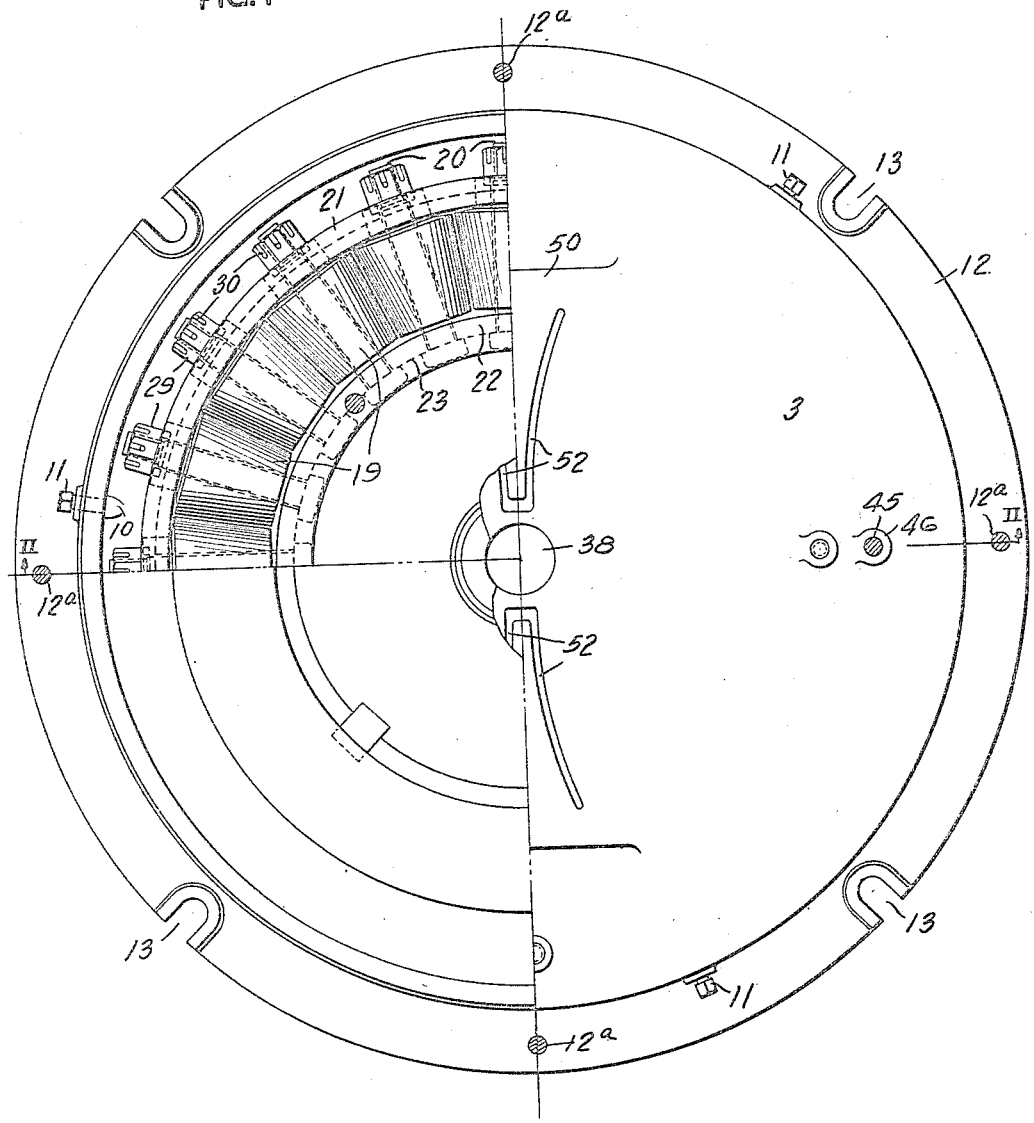

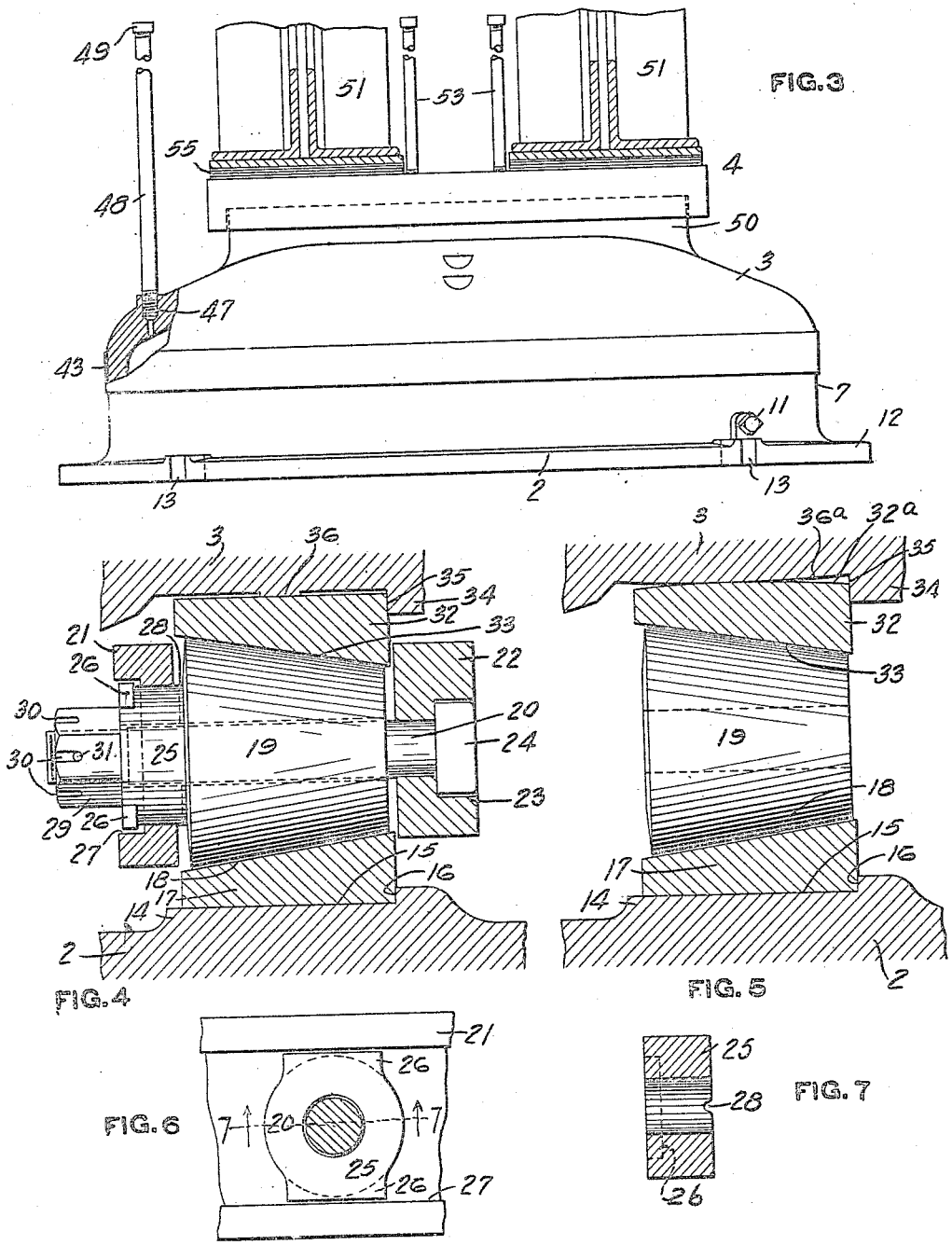

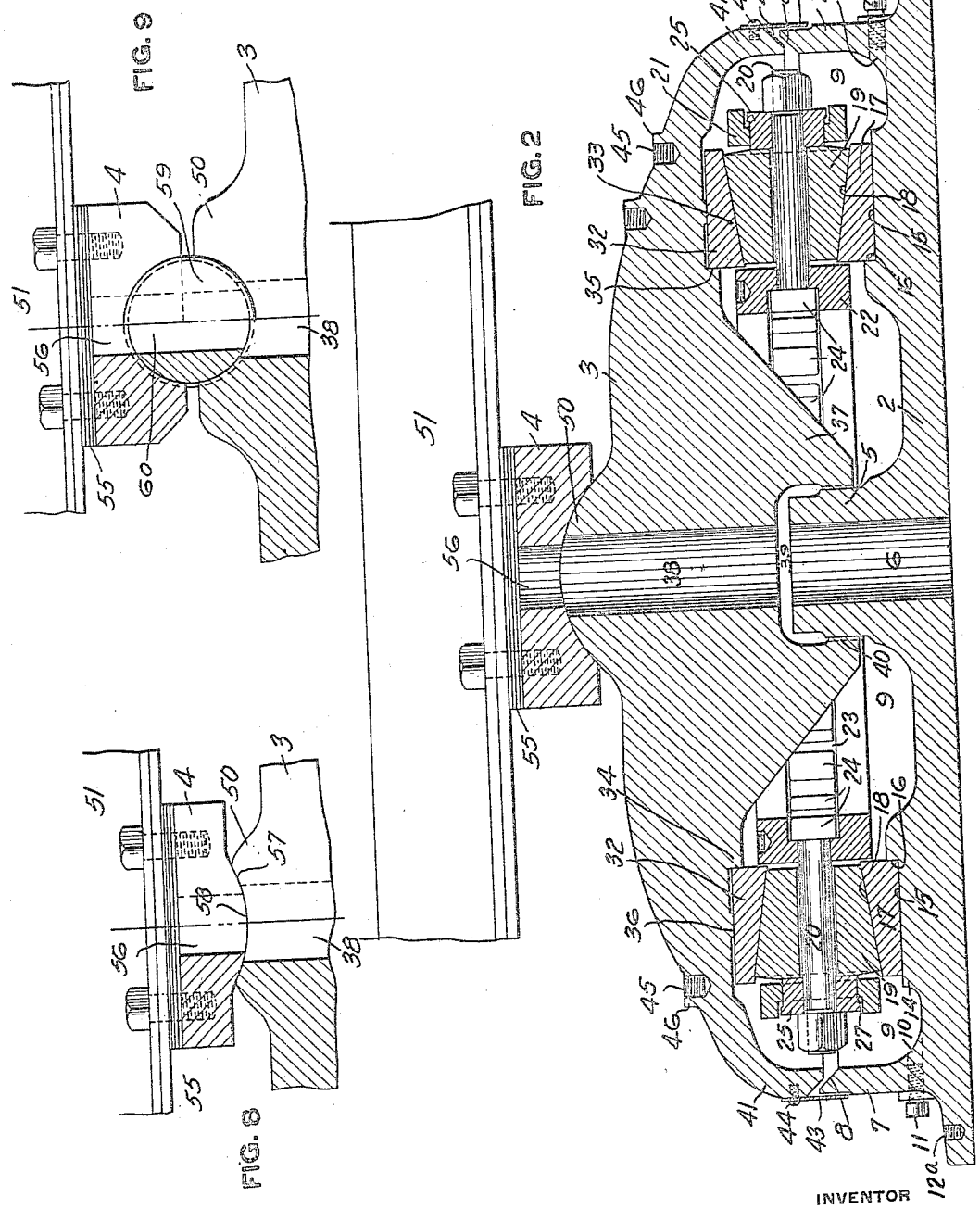

OTIS E. HOVEY, OF NEW YORK, N. Y., AND CARL W. CHASE, OF GARY, INDIANA.

CENTER-BEARING.

1,276,530.  Specification of Letters Patent.  Patented Aug. 20, 1918.

Application filed August 29, 1916.  Serial No. 117,423.

*To all whom it may concern:*

Be it known that we, OTIS E. HOVEY and CARL W. CHASE, both citizens of the United States, and residents, respectively, of New York, in the county of New York and State of New York, and Gary, in the county of Lake and State of Indiana, have invented certain new and useful Improvements in Center-Bearings, of which the following is a specification.

Our invention relates to the construction of center bearings for use on turn-tables, swinging draw bridges and similar structures which are arranged to rotate about a vertical axis of rotation of the structure, and while not restricted to such use more particularly relates to the construction of bearings known as "turn-table centers."

One object of our invention is to provide a center bearing of improved construction having novel means whereby the superimposed load carried on the bearing is concentrated and is then distributed to the various parts of the bearing, and wherein great strength and rigidity are obtained without material increase in the vertical over-all height of the bearing.

Another object of our invention is to provide a center bearing having novel means whereby the bearing rollers are adjusted to uniformly distribute the load on the rollers and whereby the rollers are held or maintained in relatively adjusted position.

Another object of our invention is to provide a center bearing having improved means for opposing the end thrust of the rollers and for transforming the end thrust of the series of rollers into radially balanced forces.

A further object of the invention is to provide a center bearing having novel means whereby the friction surfaces of the bearing are effectively lubricated.

A further object of the invention is to provide a center bearing having novel means whereby the load is applied thereto or mounted thereon, and wherein eccentric loading of the bearing is avoided and inequalities in the application of the load to the bearing rollers are overcome and prevented.

A still further object of our invention is the provision of a center bearing having the novel constructions, arrangements, and combinations of parts illustrated in the drawings, hereinafter more fully described, and pointed out specifically in the appended claims.

Referring now to the drawings, forming part of this specification, Figure 1 is a plan partly in section showing a center bearing or "turn-table center" constructed and arranged in accordance with our invention, the upper roller box and tread plate being removed in the upper left hand quarter of the figure and the rollers and thrust rings also being removed in the lower left hand quarter of the figure.

Fig. 2 is a sectional elevation of the apparatus shown in Fig. 1, the section being taken on the line II—II of Fig. 1.

Fig. 3 is an elevation of the apparatus shown in Figs. 1 and 2.

Fig. 4 is a sectional detail, on an enlarged scale, showing a preferred construction and arrangement of the roller boxes, rollers and roller tread plates, as made in accordance with our invention.

Fig. 5 is a sectional detail similar to that shown in Fig. 4 showing a modification in the construction and arrangement of the upper tread plate and upper roller box in a center bearing made in accordance with our invention.

Fig. 6 is a detail elevation showing the construction and arrangement of the roller thrust washers and the seats therefor in the annular outer live roller ring forming part of our improved apparatus.

Fig. 7 is a section on the line 7—7 of Fig. 6, showing further details in the construction of the thrust washers forming part of our improved apparatus.

Fig. 8 is an elevation, partly in section, showing a modification in the construction of the saddle and saddle support on the bearing made in accordance with this invention.

Fig. 9 is a similar elevation partly in section showing a further modification in the construction of the saddle and saddle support made in accordance with our invention.

In the accompanying drawings the numeral 2 designates the bottom or lower roller box, and 3 the top or upper roller box of a center bearing or turn-table center made in accordance with our invention, and mounted on the top of the roller box 3 is a saddle or load support 4. The lower roller box 2 has an integral upwardly extending, axially central, cylindrical projection or post 5 with an axial opening 6 extending through the post.

The roller box 2 also has an annular, vertically extending, flange 7 which is beveled at its upper edge 8, and with the central post 5 forms a recess 9 within the bottom roller box which is used as an oil reservoir or cellar. The reservoir or oil cellar 9 is kept filled with oil to about the level of the upper edge 8 of the annular flange 7 so as to cause the conical bearing rollers within the recessed roller box 2 and the bolts on which the rollers are journaled to travel in the pool of oil.

The upper end of the vertical post 5 is made long enough to extend somewhat above the beveled upper edge 8 of the flange 7, so as to prevent oil overflowing from the reservoir 9 into the post opening 6. Tapped openings 10 in the vertical flange 7, which normally are closed by means of tap-bolts or plugs 11, provide means for draining the oil reservoir or cellar 9 when required.

A horizontal flange 12 on the periphery of the roller box 2 has a series of bosses with slotted openings 13 therein through which foundation bolts extend in fastening the stationary bottom roller box to a base or foundation, and tapped openings 12ᵃ in the flange 12 provide means for the attachment of eye-bolts or equivalent devices for convenience in handling the heavy casting forming the bottom roller box and in positioning the assembled bearing on its base or foundation.

The bottom roller box 2 has an annular projection 14 within the recess 9 forming the oil cellar, the horizontal face 15 and vertical face 16 of this projection being accurately machined to support and center the annular tread plate 17 within the bottom roller box. The upper face 18 of the tread plate 17 is beveled at an angle to the horizontal and rotatably mounted on its beveled face 18 is a series of conical bearing rollers 19.

Each of the conical rollers 19 is journaled on a bolt 20 and the bolts 20 extend radially in a horizontal plane through suitable openings in the annular inner thrust rings 22 and outer spacing rings 21. The spacing ring 21 and thrust ring 22 are "live" rings, i. e., they revolve in the roller box with the rollers 19 around the vertical axis of the bearing. The inner surface of the thrust ring 22 has a groove 23 therein in which the heads 24 of the bolts 20 are located to prevent axial rotation of the bolts, and the surfaces of the bolt heads contacting with the bottom of the groove 23 in the ring 22 are of the same curvature as the bottom of the groove to afford a surface contact therebetween.

The axial openings in the outer spacing ring 21, through which the bolts 20 project, are of a diameter greater than that of the bolts, and secured in each opening is an axially adjustable collar or thrust washer 25, preferably formed of bronze or other anti-friction metal, the threaded end of the bolts 20 extending through the axial opening in the thrust washers 25.

The outer ends of the washers 25 have lugs or ears 26, 26 thereon (Figs. 4 and 6) which are seated within a peripheral recess or groove 27 in the outer face of the outer spacing ring 21 so as to prevent rotation of the thrust washers 25 on the bolts 20.

The outer ends of the conical rollers 19 have flat bearing surfaces which engage with the ends of the thrust washers 25, suitable oil grooves 28 being provided in the end of the thrust washers engaging with the rollers.

The threads on the outer ends of the bolts 20 are made of comparatively fine pitch and on the threaded end of each bolt is a castle nut 29 which bears against the outer end of the thrust washer 25 so as to resist the end thrust of the conical rollers 19. The threaded ends of the bolts 20 also are provided with one or more transverse openings or holes which coact with the slots 30 in the castle nuts to receive a cotter pin 31 and lock the nuts in adjusted position on the bolts 20.

The threads of small pitch together with the use of the castle nuts on the bolts 20 provide for a very fine adjustment of the thrust washers 25 in the ring 21 and enable the rollers 19 to be accurately adjusted lengthwise or radially so that the load or pressure can be equally distributed over the series of rollers 19 (of which twenty are used in the bearing shown). Obviously, however, the number of rollers used will be varied with changes in the size of the roller or diameter of the center bearing.

Mounted on top of the series of rollers 19 is an upper tread plate 32, having its lower face 33 beveled at the same angle to the horizontal as the periphery of the conical rollers 19 with which it engages. The tread plate 32 is positioned within the upper roller box 3 and this roller box has an annular projection or lug 34 on the interior thereof, with a vertical face 35 which is accurately machined to engage with and hold the annular tread plate 32 in centered position within the recess of the upper roller box 3.

The interior surface of the upper roller box 3 also has an annular projection 36 thereon of less width than that of the annular upper tread plate 32 (as will be seen by reference to Figs. 2 and 4) so as to concentrate the load carried by the bearing in a circular plane at the center of the width of the tread plate and corresponding center of the length of the conical bearing rollers 19. Suitable provision will be made to prevent rotation of the tread plates 17 and 32 relative to their respective roller boxes 2 and 3 when found necessary or considered desirable.

In the modified upper roller box construction shown in Fig. 5 the upper surface 32ª of the tread plate 32 and coacting surface 36ª within the upper roller box 3 are oppositely curved so as to concentrate the load at the center of the width of the tread plate and corresponding center of the length of the bearing rollers 19 instead of having flat surfaces as shown in Figs. 2 and 4.

The upper roller box 3 has a downwardly extending conical projection or post 37 which is centrally positioned within the roller box and has an axial opening 38 therethrough. The lower end of the opening 38 has a counterbore 39 to receive the upper end of the integral post or projection 5 on the lower roller box 2 (as will be clearly seen in Fig. 2). The surface of the counterbore 39 which contacts with the post or projection 5 has a series of oil grooves or slots 40 therein to facilitate lubrication of the contacting surfaces on the post 5 and counterbore 39.

By reference to Fig. 2 of the drawings it will be seen that the frusto-conical projection or post 37 on the upper roller box 3, which extends downwardly into the oil reservoir or cellar of the lower roller box 2 below the level of the pool of oil maintained therein, inclines or tapers upwardly and outwardly to a point adjacent to the upper tread plate 32, the frusto-conical post construction affording very great strength and rigidity in the upper roller box while reducing the overall thickness or height of the center bearing to a minimum, this construction and arrangement forming an important part of our invention in preventing undue increase in the height of the assembled bearing.

The upper roller box 3 has an annular integrally formed peripheral flange 41, this flange having a beveled lower edge 42 which extends into proximity to the oppositely beveled upper edge 8 of the annular vertical flange 7 on the lower roller box 2. A dust ring 43 conveniently formed of a thin strip of rolled metal, is removably secured on the periphery of the flange 41 on the upper roller box by means of cap screws 44 so as to overlap the upper edge 8 of the flange 7 and to prevent entrance to the interior of the assembled center bearing of dust or other finely divided solids which may be carried in suspension in the air.

Tapped openings 45 in the bosses 46 on the outer face of the upper roller box 3 provides means for the attachment of eye-bolts for use in handling the large and heavy casting forming the upper roller box in assembling the apparatus.

A tapped opening 47 in the upper roller box 3 has one end of a pipe 48 screwed therein, through which oil is supplied to the oil cellar 9 of the lower roller box, a removable cap 49 being employed to close the upper end of this oil pipe.

The upper roller box 3 as shown in Figs. 1 and 3 has a long ridge or projection 50 on its upper surface, this ridge which extends horizontally across the diameter of the box 3 being convex in cross section, and mounted on the ridge 50 is a saddle 4 having a concave groove in its lower surface of the same or slightly flatter curvature as the convex surface of the ridge 50. The radius of the concave and convex surfaces is made small enough to permit the saddle 4 to rock on the ridge 50, should the center of gravity of loads on the girders 51 which rest upon or are carried by the saddle 4 be placed in a position not directly above the vertical axis of the center bearing. In such case the saddle will readily slip on the ridge 50 and to provide for lubrication of the contacting surfaces of the saddle and ridge 50 on the upper roller box 3, oil grooves 52, 52, are provided in the curved surface of the ridge 50, oil being supplied to these grooves through oil pipes 53 screwed into threaded holes in the saddle 4.

Shim plates 55 are used between the flat upper surface of the saddle 4, and flat bottom surfaces of the girders 51 of the turntable, swinging draw bridge or other structure mounted upon the center bearing, to level or aline the structure on the center bearing, and to provide for vertical adjustment.

An axially central opening 56 in the saddle 4, which is in register with the alined holes 6 and 38 at the axial center of the upper and lower bearing boxes 2 and 3, affords a convenient opening for leading electric wires to the structure carried by or supported upon the bearing.

In the modified construction shown in Fig. 8 the ridge 50 on the upper surface of the upper roller box 3 is provided with a concave recess 57 and the saddle 4 has a convex ridge 58 of the same radius as the recess 57, the construction otherwise being the same as in Figs. 1, 2 and 3.

In the further modification shown in Fig. 9 the lower surface of the saddle 4 and upper surface of the ridge 50 on the upper roller box 3 both have concave recesses therein and a cylindrical pin 59 which engages with the concave surfaces of the recesses is employed to transmit the load from the saddle to the center bearing.

In the modifications of Figs. 8 and 9 a central opening 56 is provided in the saddle 4 in the same manner and for the same purpose as in Figs. 1 and 2, and a vertical opening 60 in the pin 59 is in alinement with the openings 38 and 56 in the construction of Fig. 9.

The advantages of our invention will be apparent to those skilled in the art to which this invention relates.

Modifications in the construction and arrangement of the parts of the apparatus forming our invention may be made without departing from our invention as defined in the appended claims, and the center bearing forming this invention is applicable to many devices other than a turntable.

We claim:—

1. A center bearing comprising a recessed upper box having an integral downwardly extending post therein, a recessed lower box having an integral upwardly extending post therein, said boxes being relatively rotatable, and said posts having overlapping ends arranged to maintain the boxes in axial alinement, opposite annular bearing surfaces within the recesses of said boxes, a series of radial and axially horizontal rollers between and engaging with said bearing surfaces, and means on the upper box for supporting the load transmitted to the center bearing, said means being adapted to rock on the upper roller box about a center line parallel with and above the horizontal axis of the rollers.

2. A center bearing comprising a recessed upper box having an integral downwardly extending post therein, a recessed lower box having an integral upwardly extending post therein, said boxes being relatively rotatable and said posts having overlapping ends arranged to maintain the boxes in axial alinement, opposite annular surfaces within the recesses of said boxes, a series of radial and axially horizontal frusto-conical rollers between and engaging with said bearing surfaces, and means on the upper box for supporting the load transmitted to the center bearing, said means comprising a lengthwise horizontal rib having a transversely curved surface and a load supporting saddle mounted on the rib to rock thereon, the contacting surfaces of said rib and saddle having a radius of curvature centered above the axial center of the rollers within said recessed boxes.

3. A center bearing comprising recessed relatively rotatable upper and lower roller boxes, said boxes having annular bearing surfaces in the recesses thereof, a series of radial axially horizontal anti-friction rollers between said bearing surfaces, annular inner thrust and outer spacing rings between said bearing surfaces, bolts connecting said rings on which the rollers are journaled, and thrust washers adjustably mounted on said bolts, said washers engaging with the outer ends of said rollers, and means for adjusting the washers on said bolts.

4. A center bearing comprising recessed relatively rotatable upper and lower roller boxes, said boxes having annular bearing surfaces in the recesses thereof, a series of radial axially horizontal frusto-conical rollers between said bearing surfaces, annular inner thrust and outer spacing rings, bolts connecting said rings on which said rollers are journaled, thrust washers on the bolts and engaging the outer ends of the rollers, and means for adjusting said washers on the bolts to equalize the end thrust of the rollers on said washers.

5. A center bearing comprising recessed relatively rotatable upper and lower roller boxes, said boxes having annular bearing surfaces in the recesses thereof, a series of radial axially horizontal frusto-conical rollers between the bearing surfaces, annular inner thrust and outer spacing rings, radially extending bolts connecting said rings and forming journals for said rollers, thrust washers on said bolts, said washers extending through openings in the outer spacing ring into engagement with the rollers, and means on the bolts for adjusting the thrust washers on the bolts to equalize the end thrust of the rollers on said washers.

6. A center bearing comprising recessed relatively rotatable upper and lower roller boxes, said boxes having annular bearing surfaces in the recesses thereof, a series of radial axially horizontal frusto-conical rollers between the bearing surfaces, annular inner thrust and outer spacing rings, radially extending bolts connecting said rings and forming journals for said rollers, thrust washers on said bolts, said washers extending through openings in said outer spacing ring into engagement with the ends of the rollers, and castle nuts on the bolts for adjusting the washers on the bolts to equalize the end thrust of the rollers on said washers.

7. A center bearing comprising recessed relatively rotatable upper and lower roller boxes, said boxes having annular bearing surfaces in the recesses thereof, a series of radial axially horizontal frusto-conical rollers between the bearing surfaces, annular inner thrust and outer spacing rings, radially extending bolts connecting said rings and forming journals for said rollers, thrust washers on said bolts, said washers extending through openings in said outer spacing ring into engagement with the rollers, castle nuts on the bolts for adjusting the washers on the bolts to equalize the end thrust of the rollers on said washers, and means on the spacing and thrust rings to prevent relative rotation of said bolts and thrust washers.

8. A center bearing comprising recessed relatively rotatable upper and lower roller boxes, said boxes having annular bearing surfaces in the recesses thereof, a series of radial axially horizontal frusto-conical rollers between the bearing surfaces, annular inner thrust and outer spacing rings, radially extending bolts connecting said rings and forming journals for said rollers, thrust washers on said bolts, said washers extending through openings in said outer spacing ring into engagement with the rollers, and castle nuts on the bolts for adjusting the washers on the bolts to equalize the end thrust of the rollers on said washers, said rings having slots to receive the bolt heads and the thrust washers to prevent relative rotative movement of the bolts and thrust washers.

In testimony whereof we have hereunto set our hands.

OTIS E. HOVEY.
CARL W. CHASE.